(12) United States Patent
Brookins et al.

(10) Patent No.: US 12,514,378 B2
(45) Date of Patent: Jan. 6, 2026

(54) MULTILAYER CUSHIONING ASSEMBLIES FOR THERMAL MANAGEMENT

(71) Applicant: Alexium, Inc., Greer, SC (US)

(72) Inventors: Robert N. Brookins, Greer, SC (US); Nicholas H. Leitner, Greer, SC (US); Rangana Wijayapala, Greer, SC (US)

(73) Assignee: Alexium, Inc., Greer, SC (US)

( * ) Notice: Subject to any disclaimer, the term of this patent is extended or adjusted under 35 U.S.C. 154(b) by 582 days.

(21) Appl. No.: 17/905,744

(22) PCT Filed: Mar. 4, 2021

(86) PCT No.: PCT/US2021/020954
§ 371 (c)(1),
(2) Date: Sep. 6, 2022

(87) PCT Pub. No.: WO2021/178724
PCT Pub. Date: Sep. 10, 2021

(65) Prior Publication Data
US 2023/0172368 A1     Jun. 8, 2023

Related U.S. Application Data

(60) Provisional application No. 62/984,806, filed on Mar. 4, 2020.

(51) Int. Cl.
*A47C 27/15* (2006.01)
*A47C 21/04* (2006.01)
(Continued)

(52) U.S. Cl.
CPC ............ *A47C 27/15* (2013.01); *A47C 21/046* (2013.01); *A47C 27/22* (2013.01); *B32B 5/245* (2013.01);
(Continued)

(58) Field of Classification Search
CPC ....... A47C 27/15; A47C 21/046; A47C 27/22; A47C 7/746; A47C 31/001; B32B 5/245;
(Continued)

(56) References Cited

U.S. PATENT DOCUMENTS

| | | | |
|---|---|---|---|
| 2004/0149711 | A1 | 8/2004 | Wyatt et al. |
| 2008/0255641 | A1 | 10/2008 | Ellis |

(Continued)

FOREIGN PATENT DOCUMENTS

| | | | |
|---|---|---|---|
| CN | 102497981 A | 6/2012 | |
| CN | 110356094 A | 10/2019 | |

(Continued)

OTHER PUBLICATIONS

The European Application No. EP21765403.7, "Extended European Search Report," mailed on May 22, 2024, 16 pages.

(Continued)

*Primary Examiner* — Nathan L Van Sell
(74) *Attorney, Agent, or Firm* — Kilpatrick Townsend & Stockton LLP

(57) ABSTRACT

Described herein are textile- and/or foam-based multilayer cushioning assemblies that include a thermally-conductive layer, which imparts beneficial thermal management properties without a significant adverse effect on flexibility and/or cushioning properties, so the textile- and/or foam-based multilayer compositions remain suitable for use in bedding, furniture, clothing, and other applications where they will contact a user and where user comfort is important.

16 Claims, 6 Drawing Sheets

(51) Int. Cl.
*A47C 27/22* (2006.01)
*B32B 5/24* (2006.01)
*B32B 5/32* (2006.01)
*B32B 7/12* (2006.01)
*B32B 9/02* (2006.01)
*B32B 9/04* (2006.01)
*B32B 37/12* (2006.01)
*B32B 37/20* (2006.01)

(52) U.S. Cl.
CPC ............... *B32B 5/32* (2013.01); *B32B 7/12* (2013.01); *B32B 9/025* (2013.01); *B32B 9/046* (2013.01); *B32B 37/12* (2013.01); *B32B 37/203* (2013.01); *B32B 2250/05* (2013.01); *B32B 2266/0207* (2013.01); *B32B 2266/0242* (2013.01); *B32B 2266/0278* (2013.01); *B32B 2305/022* (2013.01); *B32B 2305/18* (2013.01); *B32B 2307/302* (2013.01); *B32B 2307/3065* (2013.01)

(58) Field of Classification Search
CPC .. B32B 5/32; B32B 7/12; B32B 9/025; B32B 9/046; B32B 37/12; B32B 37/203; B32B 2250/05; B32B 2266/0207; B32B 2266/0242; B32B 2266/0278; B32B 2305/022; B32B 2305/18; B32B 2307/302; B32B 2307/3065
See application file for complete search history.

(56) References Cited

U.S. PATENT DOCUMENTS

| | | | |
|---|---|---|---|
| 2012/0279953 | A1 | 11/2012 | Augustine et al. |
| 2018/0124875 | A1* | 5/2018 | Boulbitch ............... H05B 3/34 |
| 2019/0344688 | A1 | 11/2019 | Tait |

FOREIGN PATENT DOCUMENTS

| | | |
|---|---|---|
| DE | 102009038311 A1 | 2/2011 |
| DE | 102017124504 A1 | 4/2018 |

OTHER PUBLICATIONS

The International Application No. PCT/US2021/020954, "International Preliminary Report on Patentability," mailed on Sep. 15, 2022, 8 pages.
"Copper", Wikipedia Available online at:https://en.wikipedia.org/wiki/Copper, 2020, 14 pages.
PCT/US2021/020954, "International Search Report and Written Opinion", May 21, 2021, 9 pages.
"Office Action", issued by the China National Intellectual Property Administration for counterpart application No. CN202180025684.9 on Jun. 26, 2024, 17 pages.
"Decision of Final Rejection", issued by the China National Intellectual Property Administration for CN Application No. 202180025684.9, on Feb. 27, 2025, 14 pages.
"Office Action", issued by the China National Intellectual Property Administration for CN Application No. CN202180025684.9 on Dec. 27, 2024, 12 pages.

* cited by examiner

MULTILAYER CUSHIONING ASSEMBLIES FOR THERMAL MANAGEMENT

CROSS-REFERENCE TO RELATED APPLICATIONS

This application is a national stage entry of PCT Application No. PCT/US2021/020954, filed Mar. 4, 2021, which claims priority to U.S. Provisional Patent Application No. 62/984,806, filed Mar. 4, 2020, which are hereby incorporated herein by reference in their entireties.

FIELD

Described herein are multilayer cushioning assemblies for thermal management, where the assemblies increase the rate of heat transfer as compared to conventional textile-based and/or foam-based assemblies.

BACKGROUND

Thermal management properties have become desirable in textile-based and foam-based products used for clothing, bedding, and other materials that contact individuals. These materials can absorb and retain heat from the individual, which can create a sense of discomfort for the individual. Pillows and mattresses have been developed that dissipate heat and feel cool for a period of time. The contact temperature of those products can be reduced through the integration of highly thermally conductive or heat absorbing particles into polyurethane, latex or other types of foams, or by a topical application of coatings with highly thermally conductive or heat absorbing particles. Both of those methods have significant drawbacks.

Integration of highly thermally conductive particles (thermal conductivity >200 W/m·K) into a matrix with low thermal conductivity (<5 W/m·K) increases the overall thermal conductivity of the composite material. However, the particulate nature of the thermally conductive particles provides only limited improvement of thermal conductivity in the composite material. Similarly, thermally conductive particles that are applied as part of a topical coating are incorporated into a resin-based carrier. Resins have low thermal conductivity, which counters the high conductivity of the particles, so the composite coating provides only a limited improvement in overall thermal conductivity of the coated product.

Heat absorbing particles typically include a phase change material ("PCM"), which has a high heat of fusion and is capable of storing and releasing energy at known, consistent temperatures. The amount of heat absorbed by a PCM, and thus the effect of the PCM on the heat transfer rate of a textile or foam, depends on the mass of PCM present, which is limited by technical and practical considerations, such as application technique and desired tactile properties (e.g., how the finished clothing, bedding, or other material will feel to an individual). Any microencapsulation increases the effective mass of the PCM without proportionate increase in the amount of heat that can be absorbed and also causes a super cooling effect.

It is desirable to develop textile-based and foam-based assemblies that have better thermal management properties. These assemblies would be useful in many applications, such as mattresses, upholstery, and apparel. Ideally, the assemblies would reduce the individual's sense of thermal discomfort for an extended period of time.

SUMMARY

Multilayer cushioning assemblies described herein are useful in bedding, upholstered furniture, clothing, and other applications where they will contact an individual, to increase the individual's sense of thermal comfort. The assemblies include at least one thermally-conductive layer, which includes a conductive film. In use, the conductive film transports heat away from a users body without compromising flexibility, cushioning, and other comfort-related properties of the assembly.

DETAILED DESCRIPTION

Figure 1A:
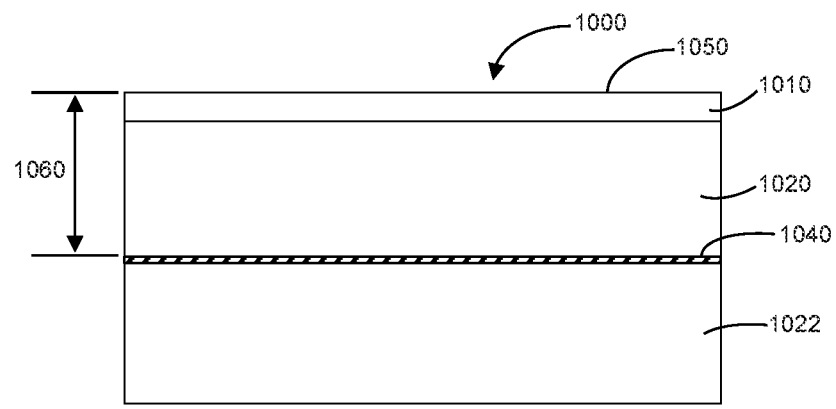
FIGS. 1A-1E are schematic representations of a cross-sectional views of various multilayer cushioning assemblies consistent with the present disclosure.

Provided herein are multilayer cushioning assemblies for use as or in consumer products, such as mattresses or seat cushions. The multilayer cushioning assemblies include at least two compressible layers and at least one thermally-conductive layer between the two compressible layers. The compressible layers include textile-based layers and/or foam-based layers, and the thermally-conductive layer imparts beneficial thermal management properties to the assembly without adversely affecting the flexibility and cushioning properties provided by the compressible layers. Thus, assemblies described herein are suitable for use in bedding, upholstered furniture, clothing, and other applications where they will contact a user and where flexibility and/or cushioning is important for user comfort. The thermally-conductive layer facilitates active heat dissipation through the assembly. In some cases, the active heat dissipation causes the assembly to feel cool to the touch for an extended period of time. This cool feeling can increase the comfort of clothing, bedding, or other products made from the assemblies.

As used herein, the term "textile" means, unless otherwise stated, any combination of fibers, including but not limited to woven, non-woven, or knitted. Non-limiting examples of textiles include fabrics and cloths. As used herein, the term "fiber" means, unless otherwise stated, any natural or synthetic polymer suitable for producing textiles. As used herein, "foam" means a solid organic material with pockets of gas trapped inside. Typically, the foam is a polymer, but in some examples the solid need not be a polymer. In any case, however, the term "foam" as used herein does not include metal foam. As used herein, the term "leather" means, unless otherwise stated, any material derived from animal rawhide or a synthetic equivalent/imitation.

As one non-limiting example, an assembly described herein may be a mattress or part of a mattress. Assemblies described herein are useful in any type of commercial mattress, such as a foam-based mattress or an inner-spring mattress. While mattresses are used as exemplary embodiments, one skilled in the art would understand that the assemblies described herein are not limited to mattresses, and alternatively could be used in any number of products where comfort, cushioning, and thermal management is desired. Non-limiting examples of such other embodiments include upholstered furniture, including sofas, stationary chairs, recliners, and theater chairs; seating in airplanes, trains, automobiles, and other forms of transportation; medical applications, such as cushions in wheelchairs, other seating, exam tables, braces, supports, and immobilizing devices; athletic and/or safety equipment, such as helmets, pads, and footwear; and other consumer and specialty textile and/or foam-based products.

A multilayer cushioning assembly described herein is a multilayer apparatus that includes at least two compressible layers and at least one thermally-conductive layer, where each thermally-conductive layer is between two of the compressible layers. The compressible layers can include a textile, fabric, foam, leather, vinyl, plastic, rubber, or latex. Optionally, the compressible layer can be a combination of two or more of the foregoing materials, such as but not limited to a carpet, wall panel, or acoustical panel. In some examples, at least one of the compressible layers is a textile layer or a foam layer. In more specific examples, the two compressible layers on either side of the thermally-conductive layer are both textiles. In alternative examples, the two compressible layers on either side of the thermally-conductive layer are both foams. The multilayer cushioning assembly can include one or more compressible layers on one side of a thermally-conductive layer and can include one or more compressible layers on the opposite side of the thermally-conductive layer. In any assembly described herein, adjacent layers can be secured together by an adhesive. Optionally however, any two layers or all of the layers may be unsecured.

The multilayer cushioning assemblies described herein are suitable for use in bedding, seating, medical supports, and other consumer products that contact a user. Thus, the multilayer cushioning assemblies include a user-facing surface. In some embodiments, the user-facing surface is an external surface of a compressible layer that actually contacts a user. In alternative embodiments, the assembly may be combined with a separate layer or cover that actually contacts the user, for example, to protect the assembly and/or to provide increased comfort, and thus the user-facing surface need not directly contact a user, but can be an external surface of the compressible layer that is closest to the user (i.e., closer to the user than any other external surface of any part of the assembly) when the assembly is in use.

FIGS. 1A-1E are schematic representations of cross-sectional views of various examples of multilayer cushioning assemblies consistent with the present disclosure. In FIG. 1A, a multilayer cushioning assembly 1000 includes, from top to bottom, a textile layer 1010, a first foam layer 1020, a thermally-conductive layer 1040, and a second foam layer 1022. Optionally, the thermally conductive layer 1040 can be secured to one or both of the the adjacent foam layers 1020, 1022 by an adhesive (not shown). The top layer of FIG. 1A, the textile layer 1010, is intended to be positioned closest to a user and optionally contacts the user, so the top surface 1050 of textile layer 1010 is the user-facing surface 1050 of the assembly 1000. The thermally-conductive layer 1040 is separated from the user-facing surface 1050 by a partial thickness 1060 of the assembly 1000. In alternative examples, the assembly need not include the top textile layer 1010. In other examples, the textile layer 1010 can instead be a leather layer. In still other examples, the multilayer cushioning assembly can include additional textile, leather, and/or foam layers in any position and on either side of the thermally-conductive layer and/or can have additional thermally-conductive layers in any position.

Figure 1B:
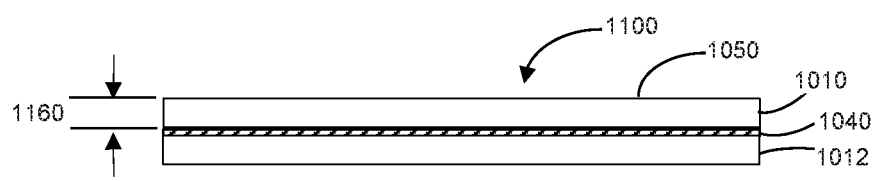

In FIG. 1B, a multilayer cushioning assembly 1100 includes, from top to bottom, a first textile layer 1010, a thermally-conductive layer 1040, and a second textile layer 1012. Optionally, the thermally conductive layer can be secured to one or both of the adjacent textile layers 1010, 1012 by an adhesive (not shown). The top layer of FIG. 1B, the textile layer 1010, is intended to be positioned closest to a user and optionally contacts the user, so the top surface 1050 of textile layer 1010 is the user-facing surface 1050 of the assembly 1100. The thermally-conductive layer 1040 is separated from the user-facing surface 1050 by a partial thickness 1160 of the assembly 1100. In alternative examples, the multilayer cushioning assembly can include additional textile, leather, and/or foam layers in any position and on either side of the thermally-conductive layer and/or can have additional thermally-conductive layers in any position.

Figure 1C:
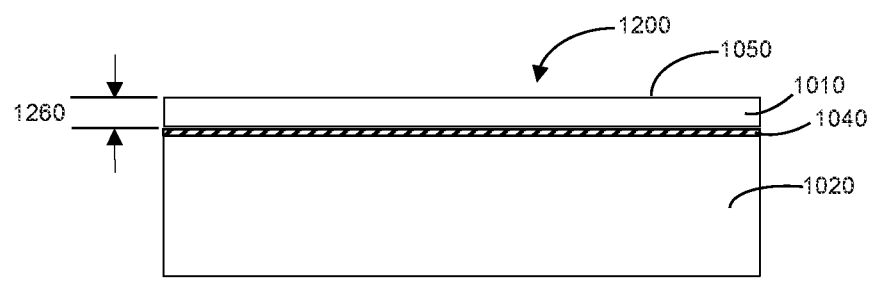

In FIG. 1C, a multilayer cushioning assembly 1200 includes, from top to bottom, a textile layer 1010, a thermally-conductive layer 1040, and a foam layer 1020. Optionally, the thermally conductive layer 1040 can be secured to the adjacent textile layer 1010 and/or the adjacent foam layer 1020 by an adhesive (not shown). The top layer of FIG. 1C, the textile layer 1010, is intended to be positioned closest to a user and optionally contacts the user, so the top surface 1050 of textile layer 1010 is the user-facing surface 1050 of the assembly 1200. The thermally-conductive layer 1040 is separated from the user-facing surface 1050 by a partial thickness 1260 of the assembly 1200. In alternative examples, the multilayer cushioning assembly can include additional textile, leather, and/or foam layers in any position and on either side of the thermally-conductive layer and/or can have additional thermally-conductive layers in any position.

Figure 1D:
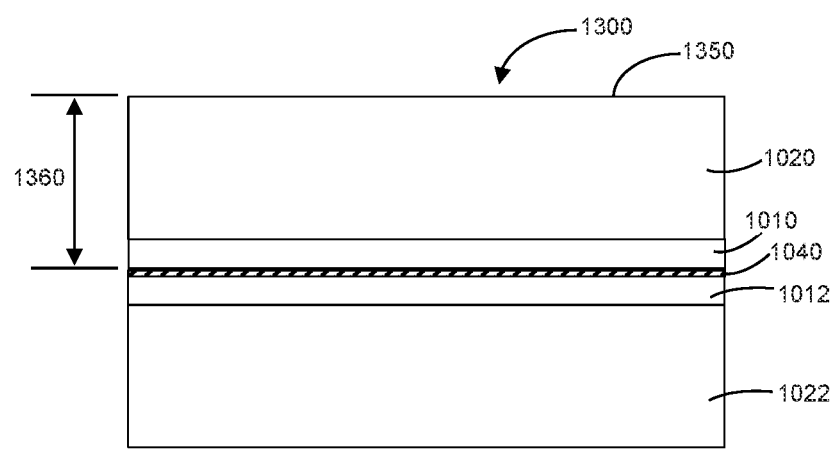

In FIG. 1D, a multilayer cushioning assembly 1300 includes, from top to bottom, a first foam layer 1020, a first textile layer 1010, a thermally-conductive layer 1040, a second textile layer 1012, and a second foam layer 1022. Optionally, the thermally conductive layer 1040 can be secured to one or both of the adjacent textile layers 1010, 1012 with an adhesive (not shown). Optionally, the first foam layer 1020 and first textile layer 1010 or the second foam layer 1022 and the second textile layer 1012 can be secured together by an adhesive (not shown). The top layer of FIG. 1D, the first foam layer 1020, is intended to be positioned closest to a user and optionally contacts the user, so the top surface 1350 of the first foam layer 1020 is the user-facing surface 1350 of the assembly 1300. The thermally-conductive layer 1040 is separated from the user-facing surface 1350 by a partial thickness 1360 of the assembly 1300. In alternative examples, the multilayer cushioning assembly can include additional textile, leather, and/or foam layers in any position and on either side of the thermally-conductive layer and/or can have additional thermally-conductive layers in any position.

Figure 1E:
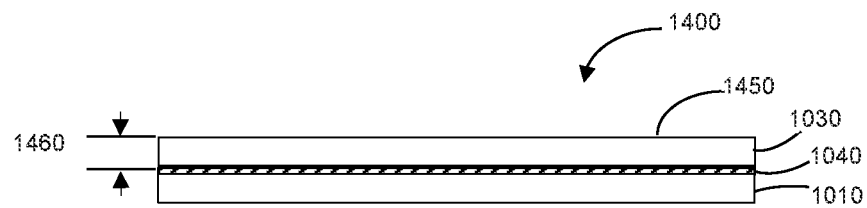

In FIG. 1E, a multilayer cushioning assembly 1400 includes, from top to bottom, a leather layer 1030, a thermally-conductive layer 1040, and a textile layer 1010. Optionally, the thermally conductive layer 1040 can be secured to the adjacent leather layer 1030 and/or to the adjacent textile layer 1010 with an adhesive (not shown). The top layer of FIG. 1E, the leather layer 1030, is intended to be positioned closest to a user and optionally contacts the user, so the top surface 1450 of the leather layer 1030 is the user-facing surface 1450 of the assembly 1400. The thermally-conductive layer 1040 is separated from the user-facing surface 1450 by a partial thickness 1460 of the assembly 1400. In alternative examples, the multilayer cushioning assembly can include additional textile, leather, and/or foam layers in any position and on either side of the thermally-conductive layer and/or can have additional thermally-conductive layers in any position.

In any assembly described herein, the compressible layers generally provide cushioning and/or a soft feel to the assembly, and the thermally-conductive layer can contribute to user-comfort by rapidly transporting heat, such as a user's body heat, so the assembly does not feel too warm and/or even feels cool to the touch. In some embodiments, the assembly can feel cool to the touch for an extended period of time. However, if the materials in the assembly are not selected and positioned properly, the thermally-conductive layer can adversely affect the flexibility and cushioning properties of the multilayer cushioning assembly. Thus, the compressible layers and the thermally-conductive layer must be selected and arranged to provide desired thermal properties as well as desired flexibility and cushioning.

Preferably, when the assembly is in use, the layer positioned closest to the user should be a compressible layer, not a thermally-conductive layer. That layer will include the user-facing surface of the assembly and the assembly will have a partial thickness measured from the user-facing surface to the closest thermally-conductive layer. That partial thickness may be different for different assemblies, depending on type and position of layers in the assembly, which depends on the desired end use of the assembly. The thermally-conductive layer should be close enough to the user, or to the user-facing surface, to absorb the user's body heat, but not so close as to adversely affect the user's comfort. In some examples, a partial thickness of a multilayer cushioning assembly measured from the user-facing surface to the closest thermally-conductive layer is from about 0.5 mm to 200 mm, from about 10 mm to about 200 mm, from about 20 mm to about 200 mm, or from about 50 mm to about 200 mm. In other examples, a partial thickness of the multilayer cushioning assembly measured from the user-facing surface to the closest thermally-conductive layer is from about 0.5 mm to about 100 mm, from about 5 mm to about 75 mm, from about 10 mm to 50 mm, from about 40 mm to about 70 mm, or from about 20 mm to about 50 mm.

In any assemblies described herein, the thermally-conductive layer includes a conductive foil, which is a very thin sheet of a conductive material. The conductive material can be metal-based, mineral-based, or carbon-based, as long as it is conductive. Conductive foil useful in the assemblies described herein has a thermal conductivity of at least 200 W/m-K, at least 300 W/m-K, at least 400 W/m-K, at least 500 W/m-K, at least 700 W/m-K, or at least 900 W/m-K. In some examples, the conductive foil can have a thermal conductivity of 500 W/m-K to 1000 W/m-K, 900 W/m-K to 1500 W/m-K, 900 W/m-K to 2000 W/m-K, 900 W/m-K to 2500 W/m-K, or 900 W/m-K to 3000 W/m-K. The conductive foils described herein are inorganic materials. Examples of suitable conductive foils include, but are not limited to, metal foils, metal alloy foils, metal oxide foils, metal nitride foils, mineral-based foils, and carbon-based foils. In some embodiments, examples of suitable conductive foils include, but are not limited to foils formed from aluminum or its alloys, copper or its alloys, silver or its alloys, gold or its alloys, aluminum oxide, aluminum nitride, silicon carbide, and graphite.

In most examples, the conductive foils described herein are very thin sheets with a substantially homogenous composition throughout. As used herein, substantially homogeneous means compositionally consistent on a micron or greater scale. The conductive foils described herein do not include particulate-based coatings. As used herein, particulate-based coating refers to a heterogeneous mixture of thermally conductive particles in a matrix with lower thermal conductivity, such as a resin. The individual conductive particles are distinguishable within the material by common analytical methods. The thermally conductive particles provide many individual conductive surfaces of very small surface area (e.g., micron, or sub-micron sized); however, the less or non-conductive matrix limits the conductivity imparted to the compressible material by the particulate-based coating. In some embodiments, the conductive foil has a thickness of from about 10 μm to about 200 μm, from about 10 μm to about 125 μm, from about 10 μm to about 100 μm, from about 10 μm to about 75 μm, from about 10 μm to about 60 μm or from about 20 μm to about 75 μm, from about 20 μm to about 60 μm, or from about 20 μm to about 40 μm.

Optionally, the thermally-conductive layer further includes a protective coating that can, but need not necessarily, improve at least one mechanical property of the conductive foil. For example, a protective coating may increase the durability, tensile strength, tear resistance, and/or other desirable properties of a conductive foil. Optionally, the protective coating can be a polymeric coating, such as such as polyethylene terephthalate (PET), polyvinyl chloride (PVC), polyethylene (PE), polypropylene (PP), or a combination thereof. Optionally, the protective coating has a thickness of from about 5 μm to about 50 μm.

Additionally or alternatively, the thermally-conductive layer can be laminated, or otherwise secured, to an adjacent textile layer, and that textile layer can improve at least one mechanical property of the thermally-conductive layer. Optionally, the thermally conductive layer is laminated to two adjacent textile layers, with one textile layer on each side of the thermally conductive layer.

In some examples, the thermally-conductive layer is continuous. In most examples, the other compressible layers are continuous, but they need not necessarily be continuous. As used herein to describe the layers, "continuous" means the layer is intact across its length and width (or analogous dimensions for a non-rectangular film). That is, a continuous layer has no intentional cuts, holes, tears, or other openings that extend through the thickness of the layer, from one side to the other, where the thickness is the shortest dimension of the layer. An example of a continuous layer is one in which any 2 points on a surface the layer have an un-interrupted connection across a straight line from one point to the other.

In alternative examples, the thermally-conductive layer is semi-continuous. As used herein to describe the layers, "semi-continuous" means the layer has some openings (cuts, tears, holes, or other voids) that extend through the entire thickness of the film from one side to the other, but none of those openings also extend through the entire width or the entire length of the thermally conductive film. An example of a semi-continuous layer is one in which any 2 points on a surface of the layer have an un-interrupted connection from one point to the other, but that connection may not be a straight line. In some embodiments, a semi-continuous film has a surface area of not less than 50 mm$^2$, e.g., not less than 500 mm$^2$, not less than 1000 mm$^2$, not less than 10,000 mm$^2$, not less than 100,000 mm$^2$, not less than 500,000 mm$^2$, not less than 1,000,0000 mm$^2$, or not less than 4,000,000 mm$^2$.

Figure 2A:
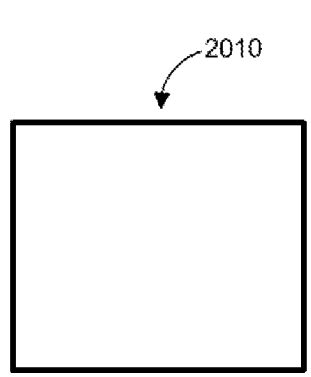
FIGS. 2A-2J are schematic representations of various thermally conductive layers consistent with the present disclosure.
Figure 2B:
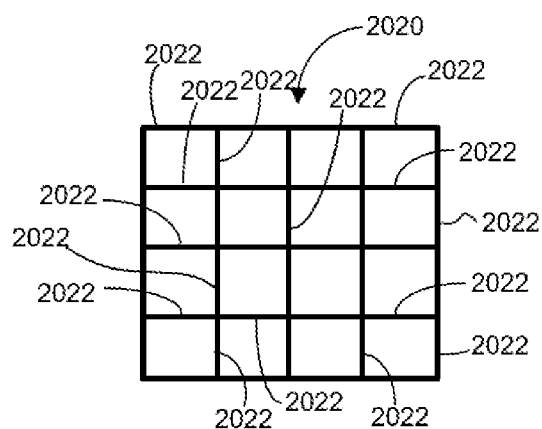
Figure 2C:
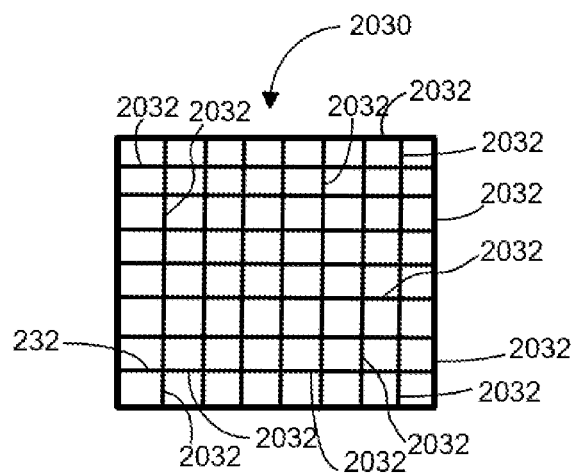
Figure 2D:
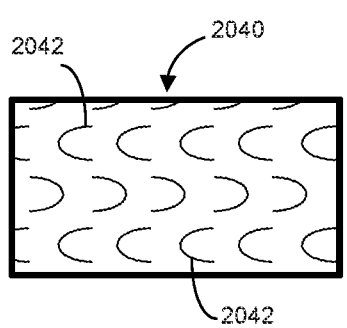
Figure 2E:
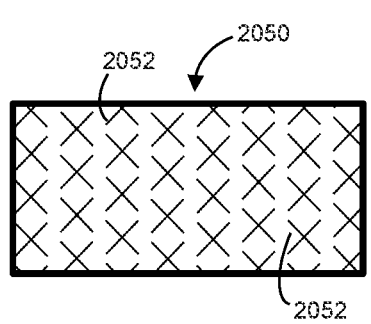
Figure 2F:
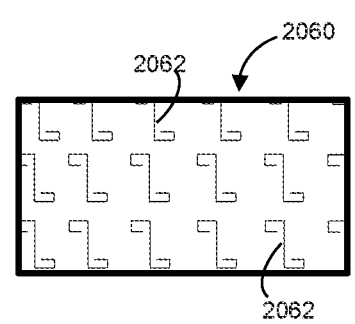

FIGS. 2A-2J are schematic representations of various examples of thermally-conductive layers described herein. FIG. 2A is a top view of a continuous thermally-conductive layer 2010, with no cuts or voids. FIGS. 2B and 2C are top views of semi-continuous, thermally-conductive layers 2020, 2030 each with an area of 16 units, where film 2020 has 2 cuts 2022 per square unit, and film 2030 has 4 cuts 2032 per square unit. FIGS. 2D, 2E, and 2F are top views of semi-continuous thermally conductive layers 2040, 2050, 2060 with voids 2042, 2052, 2062 through the thickness of the layers 2040, 2050, 2060.

Figure 2G:
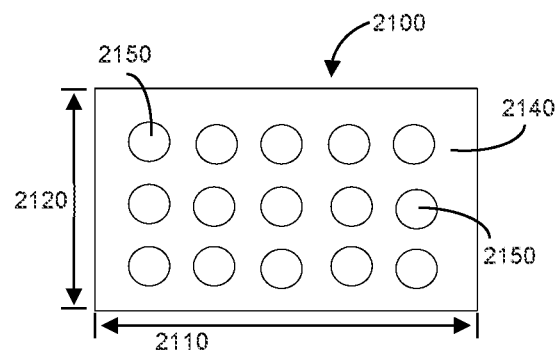
Figure 2I:
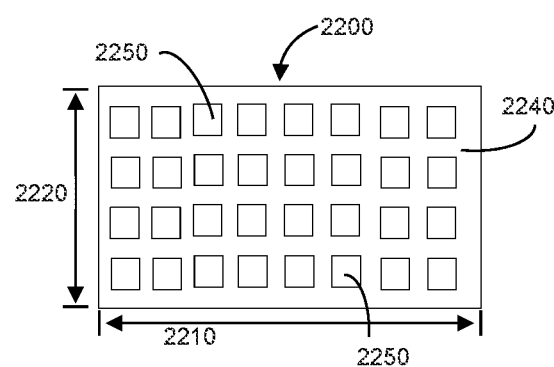
Figure 2H:
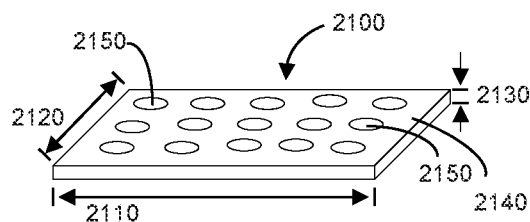
Figure 2J:
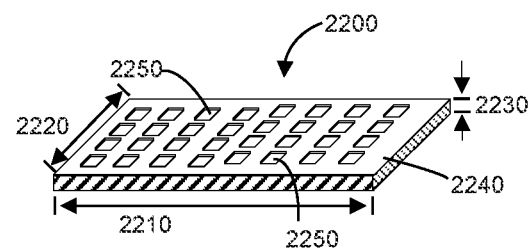

FIG. 2G is a top view and FIG. 2H is a perspective view of a continuous thermally-conductive layer 2100, with a length 2110, a width 2120, a thickness 2130, a semi-continuous surface 2140, and a plurality of circular openings 2150 through the thickness 2130 of the layer 2100. FIG. 2I is a top view and FIG. 2J is a perspective view of a semi-continuous thermally-conductive layer 2200, with a length 2210, a width 2220, a thickness 2230, a semi-continuous surface 2240, and a plurality of rectangular perforations 2250 through the thickness 2230 of the layer 2200.

When a semi-continuous thermally-conductive layer includes a protective coating, the openings through the thermally-conductive layer extend through both the conductive foil and the protective coating. When a semi-continuous thermally conductive layer is laminated to one or two adjacent textile layers, the adjacent textile layer on one or both sides of the thermally-conductive layer can be continuous or can have one or more openings coextensive with the openings through the thermally-conductive layer. In some examples, each opening in the thermally-conductive layer also extends through the adjacent textile layer(s). In some examples, the thermally-conductive layer is laminated to the adjacent textile layer(s) while both are intact, and the layers are perforated at the same time.

Figure 3A:
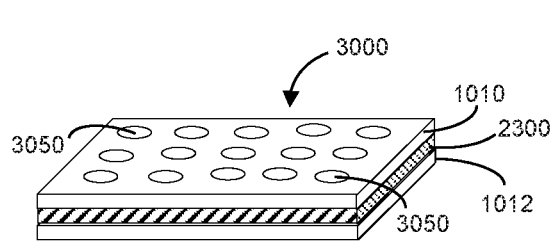
FIGS. 3A and 3B are schematic representations of a multilayer cushioning assembly consistent with the present disclosure.
Figure 3B:
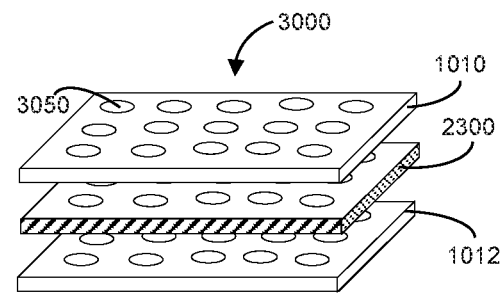

FIG. 3A is a perspective view and FIG. 3B is an exploded perspective view of an assembly 3000 with a semi-continuous, thermally-conductive layer 2300 laminated between two textile layers 1010, 1012, and a plurality of circular perforations 3050 through the thermally-conductive layer 2300 and through both textile layers 1010, 1012.

In some examples, a semi-continuous film can include holes ranging in size from about 0.1 mm to about 100 mm diameter, e.g., about 0.1 mm to about 80 mm, about 0.1 mm to about 60 mm, about 0.1 mm to about 40 mm, about 0.1 to about 20 mm, about 0.5 mm to about 20 mm, about 1 mm to about 20 mm, about 10 mm to about 20 mm, about 10 mm to about 40 mm, about 10 mm to about 60 mm, about 10 mm to about 80 mm, about 10 mm to about 100 mm, about 25 mm to about 100 mm, about 25 mm to about 75 mm, about 25 mm to about 50 mm. Optionally, the openings through a semi-continuous thermally-conductive layer can be any shape, such as circles, lines, curves, or spirals; letters or words; pictures; a pattern of repeating shapes, such as stripes; or a combination thereof.

When a thermally-conductive layer is semi-continuous the surface substantially perpendicular to the thickness includes solid areas and open areas. In some examples, The holes or other openings in the semi-continuous layer collectively provide a total open area that is up to 70% of the surface area of an identical layer without holes, e.g., up to 5%, up to 10%, up to 15%, up to 20%, up to 25%, up to 30%, up to 35%, up to 40%, up to 45%, up to 50%, up to 55%, up to 60%, up to 65%, or up to 70%. In some examples, the holes or other openings in the semi-continuous layer provide a total open area that is from about 5% to about 70% of the surface area of an identical layer without holes, e.g., from about 5% to about 65%, about 5% to about 60%, about 5% to about 55%, about 5% to about 50%, about 5% to about 45%, or about 5% to about 40%.

As an alternative to describing the semi-continuous layer in terms of percent open area, the semi-continuous layer can be described by its percent solid surface area, or "percent continuity." The terms "percent continuity" and "percent continuous" are used herein to describe the ratio of the solid surface area of a semi-continuous layer to the surface area if the same layer were continuous. The surface area of the semi-continuous layer ($SA_{sc}$) is equal to the surface area if the layer were continuous, less the surface area displaced by the openings ($SA_o$).

$$SA_{sc} = SA_{cont} - SA_o$$

As one non-limiting example, a rectangular semi-continuous, thermally-conductive layer of length l, width w, and n circular openings of radius r through the layer, would have a surface area, $SA_{sc}$, of $$SA_{sc} = lw - n\pi r^2.$$

The same layer would have a percent continuity equal to the ratio of $SA_{sc}$ to $SA_{cont}$ $$\% \text{ Continuity} = \frac{SA_{sc}}{SA_{cont.}} \times 100 = \frac{lw - n\pi r^2}{lw} \times 100$$

In some examples, a semi-continuous, thermally-conductive layer has a percent continuity (percent solid surface area) of at least 30%, at least 35%, at least 40%, at least 45%, at least 50%, at least 55%, at least 60%, at least 65%, at least 70% at least 75%, at least 80%, at least 85%, at least 90%, at least 95%, or at least 99%. Optionally, the semi-continuous, thermally-conductive layer has a percent continuity of from about 30% to about 90%, e.g, from about 35% to about 90%, from about 40% to about 90%, from about 45% to about 90%, from about 50% to about 90%, from about 50% to about 85%, from about 50% to about 80%.

The dimensions of the assembly and of each layer will vary depending upon the intended use of the final product. The various layers within the assembly can be coextensive, i.e., they can have the same peripheral shape and can be superposed, but in some examples they need not be coextensive. The surface area of adjacent layers can vary by 1%, 5%, 10%, or more. In some examples, the thermally-conductive layer has substantially the same peripheral shape and dimensions as the user-facing surface. In some examples, the thermally-conductive layer has an area within its external periphery (equivalent to the surface area of a continuous layer) that is at leas 50% of the size of the surface area of the user facing surface, e.g., at least 60%, at least 75%, at least 80%, at least 85%, at least, 90%, at least 95%, at least 99%, or substantially 100%. Representative dimensions for the surface in contact with the user will range from 50 mm$^2$ up to 4,000,000 mm$^2$ (4 m$^2$). The thickness of the assembly will range from 1.5 mm to 500 mm. The dimensions of adjacent layers within the assembly may be the same, but need not be the same.

In any assembly disclosed herein, the compressible layers are selected from textile layers, leather layers, and/or foam layers. Textiles suitable for use in any multilayer cushioning assembly described herein can be woven, non-woven, or knitted and can include plant fibers (e.g., ramie or linen), cellulosic fibers (e.g., cotton, bamboo, or hemp); synthetic fibers (e.g., polyester, nylon, rayon, or polyolefin), animal-derived fibers (e.g., wool or silk), glass fibers, any other known fibers, or combinations thereof. In some examples, a textile layer comprises cotton, linen, rayon, polyester, polyethylene, polypropylene, nylon, or a combination thereof. Optionally, a textile layer includes a flame resistant textile or a textile including flame resistant fibers, such as glass fibers or FR cotton/natural fibers. In some examples, a textile layer is a mattress ticking fabric. In some assemblies described herein Polymeric foams are suitable for use in the multilayer cushioning assemblies described herein. Examples of suitable polymeric foams include but are not limited to polyurethane foams, polyacrylic foams, and/or latex foams, such as those typically used in mattress assemblies. The term "foam" as used herein does not include metal foam.

Optionally, any layer of the multilayer cushioning assembly can be secured to an adjacent layer with an adhesive. In some examples, the adhesive is a pressure sensitive adhesive. Optionally, the adhesive can be an acrylic-based adhesive, a rubber-based adhesive, or a silicone-based adhesive. Alternatively, two non-adjacent layers can be secured together around part of all of their perimeters if the non-adjacent layers are larger than an intervening adjacent layer. The intermediate layer can be secured to one or both of the adjacent layers, but it need not be. As an example, if a thermally-conductive layer is smaller than two compressible layers on either side of the thermally-conductive layer, the two compressible layers can be secured together outside of at least a portion of the perimeter of the thermally-conductive layer.

Figure 4A:
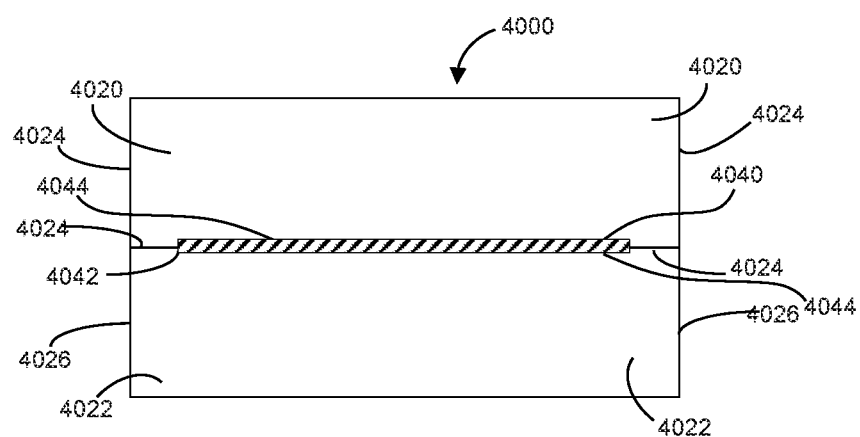
FIGS. 4A and 4B are schematic representations of a multilayer cushioning assembly consistent with the present disclosure.
Figure 4B:
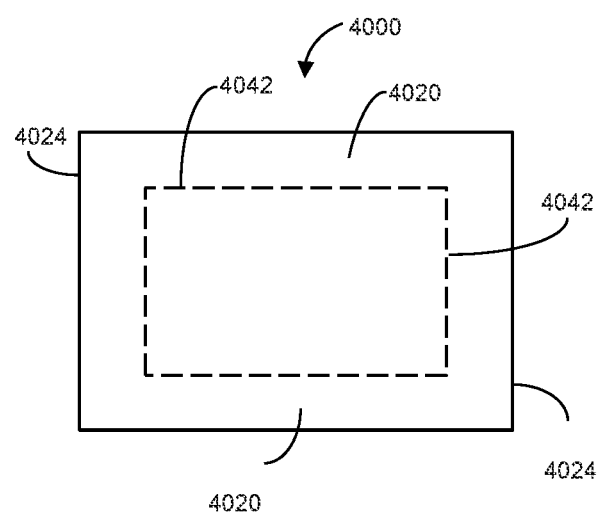

FIG. 4A is a schematic representation of a cross-sectional view of a multilayer cushioning assembly 4000 described herein, and FIG. 4B is a schematic representation of a top view of the same multilayer cushioning assembly 4000. The multilayer cushioning assembly 4000 has a thermally-conductive layer 4040 between two foam layers 4020, 4022. The thermally-conductive layer 4040 has a perimeter 4042 that is inside the perimeters 4024, 4026 of the two foam layers 4020, 4022 so the two foam layers 4020, 4022 contact the thermally-conductive layer 4040 at interfaces 4044 and contact each other at interface 4028. Optionally, an adhesive (not shown) can bond one or both of the foam layers 4020, 4022 to the thermally-conductive layer 4040 at interface 4044 and/or can bond the two foam layers 4020, 4022 together at interface 4028.

The multilayer cushioning assemblies described herein have increased heat flux as compared to an equivalent assembly that lacks the thermally-conductive layer or layers. The heat flux is defined as a flow of energy per unit of area per unit of time. Unless stated otherwise, the heat flux values identified herein are determined according to ANSI/RESNA SS-1 *Section 4: Standard Protocol for Measuring Heat and Moisture Dissipation Characteristics of Full Body Support Surfaces—Sweating Guarded Hot Plate (SGHP) Method* (2014). The assemblies described herein and equivalent assemblies lacking a thermally-conductive layer have heat fluxes that inherently decrease over time from an initial heat flux to a steady state heat flux. The initial heat flux is the heat flux at the time heat is applied to the user-facing surface. The steady state heat flux is achieved when the heat flux does not change or is substantially constant over time. As used herein to describe heat flux, steady state means the heat flux changes by less than 3 $W/m^2$ over a 60 minute period.

In some embodiments, the multilayer cushioning assemblies described herein have a steady state heat flux that is greater than a comparative assembly that is equivalent, but that lacks any thermally-conductive film. For example, the multilayer cushioning assemblies described herein can have a steady state heat flux that is greater than the comparative assembly by about 25%, by about 50%, by about 100%, by about 150%, or by about 200%. In some embodiments, the multilayer cushioning assemblies described herein have a steady state heat flux of at least 15 $W/m^2$, at least 20 $W/m^2$, at least 25 $W/m^2$, at least 30 $W/m^2$, at least 35 $W/m^2$, or at least 40 $W/m^2$.

EXAMPLES

The following examples are set forth below to illustrate the methods and results according to the disclosed subject matter. These examples are not intended to be inclusive of all aspects of the subject matter disclosed herein, but rather to illustrate representative methods and results.

These examples are not intended to exclude equivalents and variations of the subject matter described herein which are apparent to one skilled in the art.

Heat flux data reported herein was measured according to ANSI/RESNA SS-1 *Section 4: Standard Protocol for Measuring Heat and Moisture Dissipation Characteristics of Full Body Support Surfaces—Sweating Guarded Hot Plate (SGHP) Method* (2014).

Each mattress assembly tested herein was representative of a standard foam-based mattress. Each assembly included a ticking fabric, an industry standard FR sock material below the ticking fabric, a one-inch piece of polyurethane foam below the FR sock material and an identical piece of polyurethane foam below the first piece. The ticking fabric was a knitted textile having 100% polyester fibers, was about 440 grams per square meter (gsm), and was about 10 mm thick. The FR sock was a fiberglass-based material, was about 180 gsm, and was about 3 mm thick. The two foam pieces were each 25 mm thick polyurethane foam with a density of 4 pounds per square foot with no FR added. These layers were stacked on top of a base foam common in consumer mattresses. The base foam was a 100 mm thick polyurethane foam with a density of 4 pounds per square foot with no FR added. Certain mattress assemblies further included a thermally conductive film or another thermally conductive component as indicated below.

Example 1: Comparison of Thermally-Conductive Materials

Rates of heat transfer, measured as heat flux, were measured for three mattress assemblies with or without thermally-conductive layers. All mattress assemblies were based on the standard mattress assembly described above.

The first mattress assembly was standard, as described above, without a thermally-conductive layer.

The second mattress assembly was as described above, and further included a 50 μm thick coating of conductive alumina powder dispersed in polyurethane resin on the top surface of the polyurethane foam immediately below the FR sock material. The coating extended continuously across the entire top surface of the foam. The coating was applied directly to the polyurethane foam as approximately 20% (w/w) alumina powder, approximately 10% (w/w) aliphatic polyurethane dispersion, and 0.5% (w/w) wetting agent, and was cured in an oven until dry. No adhesive was used to secure adjacent layers.

The third mattress assembly was as described above, and further included an 80 μm thick conductive aluminum foil on the top surface of the polyurethane foam immediately below the FR sock material. The conductive aluminum foil extended continuously across the entire top surface of the foam. No adhesive was used to secure adjacent layers.

The heat flux was measured as described above at varying times and the associated data is summarized in Table 1. The results indicate a permanent increase in the heat flux for the mattress assembly incorporating the thermally-conductive layer.

TABLE 1

| Heat flux @ t= | Standard mattress assembly | Mattress including conductive powder | Mattress including conductive film layer |
| --- | --- | --- | --- |
| 60 min | 20.5 W/m² | 20.7 W/m² | 36.5 W/m² |
| 120 min | 14.8 W/m² | | 33.0 W/m² |
| 180 min | 12.5 W/m² | | 33.1 W/m² |
| 240 min | 11.5 W/m² | | 33.3 W/m² |
| 300 min | 11.3 W/m² | | 32.9 W/m² |
| 360 min | 10.8 W/m² | | 32.8 W/m² |

Example 2: Positioning of Thermally-Conductive Film

Figure 5A:
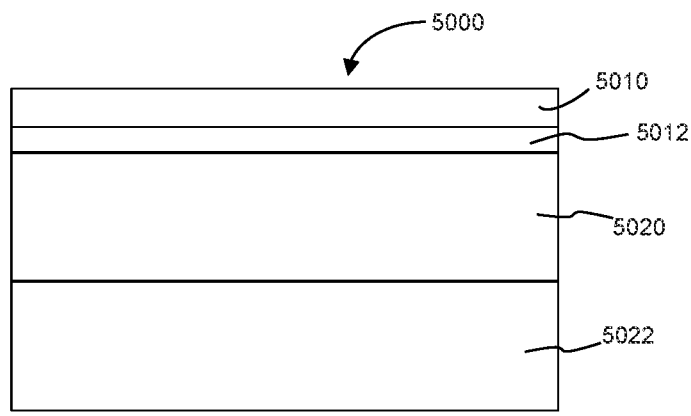
FIGS. 5A-5E are schematic representations of mattress assemblies, including a standard mattress assembly and of four multilayer cushioning assemblies consistent with the present disclosure.
Figure 5B:
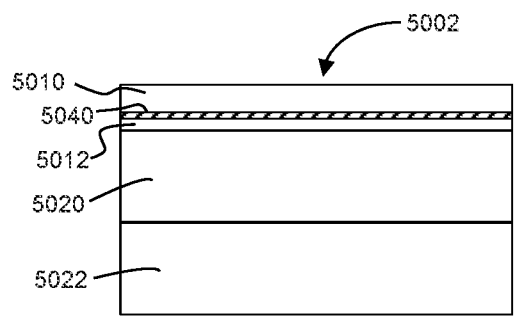

Mattress assemblies were analyzed with a thermally-conductive layer in four different locations. FIG. 5A is a schematic representation of a cross-sectional view of a standard mattress assembly 5000 including a ticking fabric 5010, an FR sock 5012, and two polyurethane foam layers 5020, 5022. FIGS. 5B-5E are schematic representations of cross-sectional views of four exemplary multilayer cushioning assemblies 5100, 5200, 5300, and 5400 described herein showing the thermally-conductive layer 5040 at different locations within the standard mattress assembly. No adhesive was used to secure adjacent layers. In each assembly, the thermally-conductive layer 5040 was a 20 μm thick conductive aluminum foil. In each assembly, the conductive aluminum foil extended continuously across the entire top surface of the foam.

Each of the mattress assemblies was analyzed for their heat dissipation performance. The data is summarized in Table 2, which also includes data for the standard mattress assembly from Example 1. The increased heat flux values measured in comparison to the standard mattress assembly demonstrates the effectiveness of the thermally-conductive layer.

TABLE 2

| Thermally-conductive film position | Heat flux at 60 min | % change from standard |
| --- | --- | --- |
| None (FIG. 5A) | 20.5 W/m² | N/A |
| Position 1 (FIG. 5B) | 28.4 W/m² | +38.5% |
| Position 2 (FIG. 5C) | 27.8 W/m² | +35.6% |
| Position 3 (FIG. 5D) | 21.5 W/m² | +4.9% |
| Position 4 (FIG. 5E) | 20.6 W/m² | +0.5% |

Figure 5C:
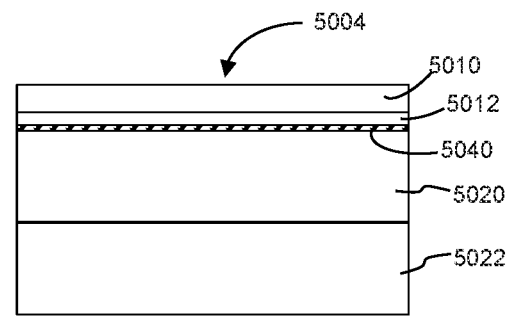
Figure 5E:
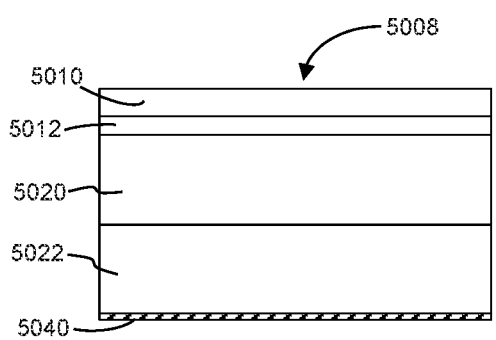
Figure 5D:
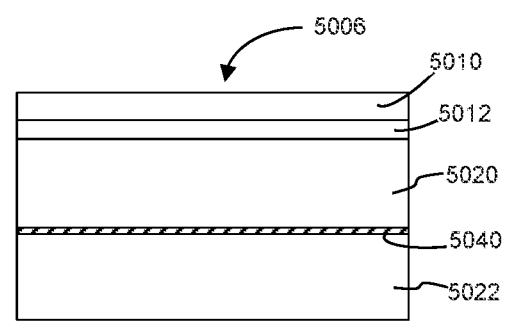

Example 3: Effects of Conductive Foil Materials and Thermally-Conductive Layer Thickness The ability of a thermally-conductive layer to rapidly dissipate heat is influenced by the conductive foil material selected as well as the thickness of the conductive foil. A series of mattress assemblies were analyzed with either a thermally-conductive layer or a thermally-conductive powder coating at Position 2, which is shown in FIG. 5C. Mattress assemblies containing conductive coatings of alumina powder or graphite powder were prepared as described above in Example 1 for the alumina powder coating. Mattress assemblies containing a thermally-conductive layer of aluminum foil were prepared by placing the aluminum foil directly on top of the one-inch polyurethane foam at Position 2 without adhesive. Mattress assemblies containing a thermally-conductive layer including graphite foil were prepared by affixing the graphite foil to the top of the one-inch foam at Position 2 using a vinyl adhesive. The graphite foil thermally conductive layers also included a thin protective coating of PE/PP. In each assembly, the thermally conductive layer extended continuously across the entire top surface of the foam.

The data is summarized in Table 3. The heat flux values indicate that selecting graphite as the conductive foil material in a thermally conductive layer with a thickness of 40 μm achieves the greatest cooling performance of those materials and films analyzed.

TABLE 3

| Material | Material conductivity | Material thickness | Heat flux @ 60 min |
| --- | --- | --- | --- |
| None | N/A | N/A | 20.5 W/m² |
| Alumina powder in PU resin | 40 W/m-K | 50 μm | 20.7 W/m² |
| Graphite powder in PU resin | 420 W/m-K | 50 μm | 20.8 W/m² |
| Aluminum foil | 205 W/m-K | 20 μm | 27.8 W/m² |
| Aluminum foil | 205 W/m-K | 40 μm | 29.9 W/m² |
| Aluminum foil | 205 W/m-K | 80 μm | 33.0 W/m² |
| Graphite foil | 1700-1800 W/m-K | 12.5 μm* | 38.0 W/m² |
| Graphite foil | 1500-1700 W/m-K | 25 μm* | 44.0 W/m² |
| Graphite foil | 1300-1500 W/m-K | 40 μm* | 46.5 W/m² |

*Thickness of graphite, not including protective laminate or adhesive.

Example 4: Effects of Film Continuity

One continuous and two semi-continuous thermally-conductive layers were tested for heat flux. Each thermally-conductive layer was 80 μm thick aluminum foil and was located at Position 2, which is shown in FIG. 5C, by affixing the film to the top of the one-inch foam with a vinyl adhesive. One of the two semi-continuous layers included 2 cuts per square inch and the other semi-continuous layer included 4 cuts per square inch, as shown in FIGS. 2B-2C. The data is summarized in Table 4.

TABLE 4

| Cuts per square inch | Heat flux @ 60 min | % Improvement over assembly with no conductive layer |
| --- | --- | --- |
| 0 | 33.0 W/m² | 67.5% |
| 2 | 25.6 W/m² | 24.9% |
| 4 | 22.1 w/m² | 7.8% |

Example 5: Effects of Film Continuity

Mattress assemblies with thermally-conductive layers having perforations of difference sizes were tested for heat flux. Each of the assemblies included, from top to bottom, a ticking fabric layer, an industry-standard FR sock layer, a high loft fabric layer (synthetic fleece fabric), a thermally-conductive layer, a layer of 25 mm polyurethane foam, and a layer of 100 mm thick polyurethane foam. Each thermally-conductive layer was graphite foil, and each thermally-conductive layer had circular perforation through the foil. The data is summarized in Table 5.

TABLE 5

| Perforation Diameter (inch) | Open (removed) Area (%) | Heat Flux at 90 min (W/m²) |
|---|---|---|
| 0.5 | 20 | 30.9 |
| 1.0 | 20 | 29.4 |
| 2.0 | 20 | 28.9 |
| 0.5 | 10 | 34.9 |
| 1.0 | 10 | 33.4 |
| 2.0 | 10 | 33.0 |

Illustrative Embodiments of Suitable Multilayer Cushioning Assemblies

As used below, any reference to a multilayer cushioning assembly or articles of manufacture is understood as a reference to each of those assemblies or articles of manufacture disjunctively (e.g., "Illustrative embodiment 1-4 is understood as illustrative embodiment 1, 2, 3, or 4.").

Illustrative embodiment 1 is a multilayer cushioning assembly comprising at least two compressible layers independently selected from a textile layer, a leather layer, and a foam layer and at least one thermally-conductive layer comprising a conductive foil, wherein the at least one thermally-conductive layer is positioned between two of the at least two compressible layers, and wherein at least one of the at least two compressible layers is a textile layer or a foam layer.

Illustrative embodiment 2 is the multilayer cushioning assembly of any preceding or subsequent illustrative embodiment, wherein the at least two compressible layers comprise first and second foam layers, and wherein the thermally-conductive layer is between and adjacent to the first and second foam layers.

Illustrative embodiment 3 is the multilayer cushioning assembly of any preceding or subsequent illustrative embodiment, wherein the at least two compressible layers further comprise a textile layer or a leather layer, wherein the textile layer or the leather layer and the first foam layer are on the same side of the thermally-conductive layer.

Illustrative embodiment 4 is the multilayer cushioning assembly of any preceding or subsequent illustrative embodiment, wherein the at least two compressible layers comprise a textile layer and a foam layer, and wherein the thermally-conductive layer is between and adjacent to the textile layer and the foam layer.

Illustrative embodiment 5 is the multilayer cushioning assembly of any preceding or subsequent illustrative embodiment, wherein the foam layer is a first foam layer, and wherein the at least two compressible layers further comprise a second foam layer, wherein the first foam layer and the second foam layer are on the same side of the thermally-conductive layer.

Illustrative embodiment 6 is the multilayer cushioning assembly of any preceding or subsequent illustrative embodiment, wherein the at least two compressible layers comprise a leather layer and a foam layer or a textile layer, and wherein the thermally-conductive layer is between and adjacent to the leather layer and the foam layer or the textile layer.

Illustrative embodiment 7 is the multilayer cushioning assembly of any preceding or subsequent illustrative embodiment, wherein the at least two compressible layers comprise two textile layers, and wherein the thermally-conductive layer is between and adjacent to the two textile layers.

Illustrative embodiment 8 is the multilayer cushioning assembly of any preceding or subsequent illustrative embodiment, wherein the conductive foil is inorganic.

Illustrative embodiment 9 is the multilayer cushioning assembly of any preceding or subsequent illustrative embodiment, wherein the conductive foil has a thermal conductivity of at least 200 W/m-K, such as at least 300 W/m-K, at least 400 W/m-K, at least 500 W/m-K, or at least 700 W/m-K.

Illustrative embodiment 10 is the multilayer cushioning assembly of any preceding or subsequent illustrative embodiment, wherein the conductive foil comprises a metal foil, a metal alloy foil, a metal oxide foil, a metal nitride foil, a mineral-based foil, a carbon-based foil, or a combination thereof.

Illustrative embodiment 11 is the multilayer cushioning assembly of any preceding or subsequent illustrative embodiment, wherein the conductive foil comprises aluminum, an aluminum alloy, copper, a copper alloy, silver, a silver alloy, gold, a gold alloy, aluminum oxide, aluminum nitride, silicon carbide, graphite, or a combination thereof.

Illustrative embodiment 12 is the multilayer cushioning assembly of any preceding or subsequent illustrative embodiment, wherein the conductive foil comprises a thickness from about 10 µm to about 200 µm, in particular from about 15 µm to about 125 µm, about 20 µm to about 75 µm, or about 25 µm to about 40 µm.

Illustrative embodiment 13 is the multilayer cushioning assembly of any preceding or subsequent illustrative embodiment, wherein the thermally-conductive layer further comprises a protective coating, such as polyethylene terephthalate (PET), polyvinyl chloride (PVC), polyethylene (PE), polypropylene (PP), or a combination thereof.

Illustrative embodiment 14 is the multilayer cushioning assembly of any preceding or subsequent illustrative embodiment, wherein the thermally-conductive layer is continuous.

Illustrative embodiment 15 is the multilayer cushioning assembly of any preceding or subsequent illustrative embodiment, wherein the thermally-conductive layer is semi-continuous and has at least 35% continuity, such as at least 50% continuity, at least 75% continuity, at least 90% continuity, or at least 99% continuity.

Illustrative embodiment 16 is the multilayer cushioning assembly of any preceding or subsequent illustrative embodiment, wherein the thermally-conductive layer is not particulate-based.

Illustrative embodiment 17 is the multilayer cushioning assembly of any preceding or subsequent illustrative embodiment, wherein the thermally-conductive layer is secured to at least one of the at least two compressible layers with an adhesive, such as a vinyl adhesive.

Illustrative embodiment 18 is the multilayer cushioning assembly of any preceding or subsequent illustrative embodiment, wherein a first compressible layer on a first side of the thermally-conductive layer and a second compressible layer on a second side of the thermally-conductive layer are secured together outside of at least a portion of a perimeter of the thermally-conductive layer.

Illustrative embodiment 19 is the multilayer cushioning assembly of any preceding or subsequent illustrative embodiment, wherein at least one of the at least two compressible layers, comprises a textile, and wherein the textile comprises fibers comprising cotton, linen, rayon, polyester, polyethylene, polypropylene, nylon, glass fibers or FR cotton/natural fibers, or a combination thereof.

Illustrative embodiment 20 is the multilayer cushioning assembly of any preceding or subsequent illustrative embodiment, wherein at least one compressible layer comprises a flame resistant textile.

Illustrative embodiment 21 is the multilayer cushioning assembly of any preceding or subsequent illustrative embodiment, wherein at least one of the at least two compressible layers comprises a foam, and wherein the foam comprises a polyurethane foam, a polyacrylic foam, or a latex foam.

Illustrative embodiment 22 is the multilayer cushioning assembly of any preceding or subsequent illustrative embodiment, further comprising a user-facing surface and a partial thickness measured from the user-facing surface to the thermally-conductive layer, wherein the thickness is from about 1 mm to 200 mm, from about 10 mm to about 200 mm, from about 20 mm to about 200 mm, from about 50 mm to about 200 mm, from about 1 mm to about 100 mm, from about 5 mm to about 75 mm, from about 10 mm to 50 mm, from about 40 mm to about 70 mm, or from about 20 mm to about 50 mm.

Illustrative embodiment 23 is the multilayer cushioning assembly of any preceding or subsequent illustrative embodiment, comprising at least two thermally-conductive layers.

Illustrative embodiment 24 is the multilayer cushioning assembly of any preceding or subsequent illustrative embodiment, comprising at least three thermally-conductive layers.

Illustrative embodiment 25 is the multilayer cushioning assembly of any preceding or subsequent illustrative embodiment, comprising a steady state heat flux of at least 15 $W/m^2$, such as at least 20 $W/m^2$, at least 25 $W/m^2$, at least 30 $W/m^2$, or at least 35 $W/m^2$.

Illustrative embodiment 26 is the multilayer cushioning assembly of any preceding or subsequent illustrative embodiment, comprising a steady state heat flux about 25% greater, such as about 50% greater, such as about 100% greater, about 150% greater, or about 200% greater than a steady state heat flux of a comparative assembly that is equivalent to the multilayer cushioning assembly but lacks any thermally-conductive film.

Illustrative embodiment 27 is the multilayer cushioning assembly of any preceding or subsequent illustrative embodiment, wherein the heat flux of the multilayer cushioning assembly is greater than 15 $W/m^2$.

Illustrative embodiment 28 is the multilayer cushioning assembly of any preceding or subsequent illustrative embodiment, wherein the conductive foil has a thermal conductivity of up to 3000 W/m·K, such as up to 1000 W/m·K, up to 1500 W/m·K, up to 2000 W/m·K, or up to 2500 W/m·K.

Illustrative embodiment 29 is the multilayer cushioning assembly of any preceding or subsequent illustrative embodiment, wherein the thermally-conductive layer has a thermal conductivity greater than a thermal conductivity of the compressible layers.

Illustrative embodiment 30 is the multilayer cushioning assembly of any preceding or subsequent illustrative embodiment, wherein the at least two compressible layers have a thermal conductivity of less than 5 W/m·K.

Illustrative embodiment 31 is the multilayer cushioning assembly of any preceding or subsequent illustrative embodiment, wherein the thermally-conductive layer has a thermal conductivity of greater than 200 W/m·K.

Illustrative embodiment 32 is the multilayer cushioning assembly of any preceding or subsequent illustrative embodiment, wherein the textile layer has an average stiffness of less than 100 N per ASTM 4032.

Illustrative embodiment 33 is the multilayer cushioning assembly of any preceding illustrative embodiment, wherein the foam layer has an Indentation Force Deflection (IFD) of less than 85 pounds at 25% indentation.

Illustrative embodiment 34 is a multilayer cushioning assembly comprising at least two compressible layers with thermal conductivity less than 5 W/m·K and at least one thermally-conductive layer with a thermal conductivity of greater than 200 W/m·K comprising a conductive foil, wherein each thermally-conductive layer is between two of the at least two compressible layers, and wherein each compressible layer is independently selected from a textile layer, a flexible leather layer, and a foam layer, optionally wherein at least one of the at least two compressible layers is a textile layer or a foam layer.

Illustrative embodiment 35 is an article of manufacture comprising the multilayer cushioning assembly of any preceding illustrative embodiments.

What is claimed is:

1. A multilayer cushioning assembly comprising at least two compressible layers and a thermally-conductive layer comprising a conductive foil, wherein the thermally-conductive layer is between two of the at least two compressible layers, wherein each compressible layer is independently selected from a textile layer, a leather layer, and a foam layer, wherein at least one of the at least two compressible layers is the textile layer or the foam layer, wherein the conductive foil comprises a graphite foil having a thermal conductivity of at least 900 W/m·K, wherein the graphite foil has a thickness of 10 μm to 60 μm, wherein the thermally-conductive layer comprises openings that extend through the entire thickness of the thermally-conductive layer from one side to the other making the layer semi-continuous, wherein the openings have a diameter from about 10 mm to about 100 mm, and wherein the thermally-conductive layer has 50% to 85% continuity.

2. The multilayer cushioning assembly of claim 1, wherein the at least two compressible layers comprise first and second foam layers, and wherein the thermally-conductive layer is between and adjacent to the first and second foam layers.

3. The multilayer cushioning assembly of claim 1, wherein the at least two compressible layers comprise the textile layer and the foam layer, and wherein the thermally-conductive layer is between and adjacent to the textile layer and the foam layer.

4. The multilayer cushioning assembly of claim 3, wherein the foam layer is a first foam layer, and wherein the at least two compressible layers further comprise a second foam layer, wherein the first foam layer and the second foam layer are on the same side of the thermally-conductive layer.

5. The multilayer cushioning assembly of claim 1, wherein the at least two compressible layers comprise two textile layers, and wherein the thermally-conductive layer is between and adjacent to the two textile layers.

6. The multilayer cushioning assembly of claim 1, wherein the conductive foil comprises a thickness of from about 20 μm to about 40 μm.

7. The multilayer cushioning assembly of claim 1, wherein the thermally-conductive layer further comprises a protective coating.

8. The multilayer cushioning assembly of claim 1, wherein the thermally-conductive layer is not particulate-based.

9. The multilayer cushioning assembly of claim 1, wherein the thermally-conductive layer is secured to at least one of the at least two compressible layers with an adhesive.

10. The multilayer cushioning assembly of claim 1, wherein a first compressible layer on a first side of the thermally-conductive layer and a second compressible layer on a second side of the thermally-conductive layer are secured together outside of at least a portion of a perimeter of the thermally-conductive layer.

11. The multilayer cushioning assembly of claim 1, wherein at least one of the at least two compressible layers comprises a foam, and wherein the foam comprises a polyurethane foam, a polyacrylic foam, or a latex foam.

12. The multilayer cushioning assembly of claim 1, further comprising a user-facing surface and a partial thickness measured from the user-facing surface to the thermally-conductive layer, wherein the partial thickness is from about 0.5 mm to about 200 mm.

13. The multilayer cushioning assembly of claim 1, comprising at least two thermally-conductive layers.

14. The multilayer cushioning assembly of claim 1, comprising at least three thermally-conductive layers.

15. The multilayer cushioning assembly of claim 1, comprising a steady state heat flux of at least 15 $W/m^2$.

16. The multilayer cushioning assembly of claim 1, comprising a steady state heat flux about 25% greater than a steady state heat flux of a comparative assembly that is equivalent to the multilayer cushioning assembly but lacks any thermally-conductive film.

\* \* \* \* \*